(12) United States Patent
Jeong (10) Patent No.: US 11,360,448 B2
(45) Date of Patent: Jun. 14, 2022

(54) POWER SUPPLY APPARATUS AND SYSTEM, AND METHOD FOR USING THE SAME

(71) Applicant: Jae Woong Jeong, Seoul (KR)

(72) Inventor: Jae Woong Jeong, Seoul (KR)

(*) Notice: Subject to any disclaimer, the term of this patent is extended or adjusted under 35 U.S.C. 154(b) by 193 days.

(21) Appl. No.: 16/718,646

(22) Filed: Dec. 18, 2019

(65) Prior Publication Data

US 2020/0125052 A1    Apr. 23, 2020

Related U.S. Application Data

(63) Continuation of application No. PCT/KR2018/008853, filed on Aug. 3, 2018.

(30) Foreign Application Priority Data

Nov. 3, 2017    (KR) .......................... 10-2017-0146115

(51) Int. Cl.
| | |
|---|---|
| *G05B 19/042* | (2006.01) |
| *B60L 53/68* | (2019.01) |
| *B60L 53/30* | (2019.01) |
| *B60L 53/16* | (2019.01) |
| *H02J 13/00* | (2006.01) |

(Continued)

(52) U.S. Cl.
CPC ............ *G05B 19/042* (2013.01); *B60L 53/16* (2019.02); *B60L 53/305* (2019.02); *B60L 53/68* (2019.02); *G06F 21/31* (2013.01); *H02J 13/00006* (2020.01); *G05B 2219/2639* (2013.01); *G06K 19/06037* (2013.01)

(58) Field of Classification Search
CPC ...................................................... G06F 21/31
USPC ................................................... 700/297
See application file for complete search history.

(56) References Cited

U.S. PATENT DOCUMENTS

| | | | |
|---|---|---|---|
| 9,035,606 B2* | 5/2015 | Ross ..................... | H02J 7/0042 |
| | | | 320/109 |
| 2002/0105235 A1* | 8/2002 | Becker ................... | H01H 43/00 |
| | | | 307/140 |

(Continued)

FOREIGN PATENT DOCUMENTS

| | | |
|---|---|---|
| JP | H11266509 A | 9/1999 |
| JP | 2010154635 A | 7/2010 |

(Continued)

OTHER PUBLICATIONS

International Search Report for PCT/KR2018/008853 dated Oct. 31, 2018.

*Primary Examiner* — Md Azad
(74) *Attorney, Agent, or Firm* — Dinsmore & Shohl LLP; Yongsok Choi, Esq.

(57) ABSTRACT

Provided is a power supply apparatus for supplying power to an external electric device. The power supply apparatus includes: a power outlet unit, to which a power plug of the external electric device is coupled, to supply electricity to the external electric device; a power control unit controlling power supply from the power outlet unit to the external electric device; and a user interface unit connected to the power control unit to receive a power activation code from a user, wherein the power control unit supplies power from the power outlet unit to the external electric device during a usage period corresponding to the power activation code.

11 Claims, 8 Drawing Sheets

(51) Int. Cl.
     *G06F 21/31*         (2013.01)
     *G06K 19/06*        (2006.01)

(56) References Cited

U.S. PATENT DOCUMENTS

| | | | |
|---|---|---|---|
| 2011/0145141 A1* | 6/2011 | Blain | B60L 3/04 |
| | | | 705/39 |
| 2013/0080254 A1* | 3/2013 | Thramann | G06Q 50/06 |
| | | | 705/14.57 |
| 2014/0125279 A1* | 5/2014 | Juhasz | B60L 53/64 |
| | | | 320/109 |
| 2016/0025506 A1* | 1/2016 | Penilla | B60L 53/665 |
| | | | 701/430 |
| 2017/0008414 A1* | 1/2017 | Han | B60L 11/1848 |

FOREIGN PATENT DOCUMENTS

| | | |
|---|---|---|
| JP | 2012055116 A | 3/2012 |
| JP | 2013099246 A | 5/2013 |
| JP | 2015094695 A | 5/2015 |
| KR | 1020110044006 A | 4/2011 |
| KR | 1020110059492 A | 6/2011 |
| KR | 101448612 B1 | 10/2014 |
| KR | 1020170109795 A | 10/2017 |

\* cited by examiner

POWER SUPPLY APPARATUS AND SYSTEM, AND METHOD FOR USING THE SAME

CROSS-REFERENCE TO RELATED APPLICATIONS

This application is a continuation of PCT/KR2018/008853 filed on Aug. 3, 2018 which claims priority to Korean Patent Application No. 10-2017-0146115 filed on Nov. 3, 2017, the entire contents of which are herein incorporated by reference.

BACKGROUND ART

One or more embodiments relate to a power supply apparatus, and more particularly, to a power supply apparatus and system which may supply power to external electric devices such as electric vehicles, and a method of using the power supply apparatus and system.

FIELD OF THE INVENTION

Due to the efforts across the globe to reduce exhaust gas emissions and carbon emissions, electric vehicles are gradually widely supplied. However, although major car manufacturers produce and sell electric vehicles, to expand the electric vehicle market more fast, social infrastructure such as charging stations for charging electric vehicles are required.

Electric vehicles according to the related art receive power from predetermined charging stations for charging electric vehicles to charge a battery of the electric vehicles and the rates for the charging is to be calculated.

When charging personal electric vehicles, such as electric bicycles, electric motorcycles, electric cars, are charged in, for example, apartment buildings where a lot of people live together, or public facilities, the issue of charging electricity consumption may be raised. In addition, when charging electric vehicles in public facilities, there is the need to charge a user, who used electricity, an accurate rate corresponding to the amount of electricity used.

However, electric vehicle charging devices according to the related art require large facility investment by limited operators, and thus, only a small number of operators are able to operate electricity charging stations. In addition, when charging electric vehicles in public facilities such as a parking space of an apartment, if users are not charged the accurate rate according to the amount of electricity used, complaints may be lodged from other residents.

To address this issue, there is a need for a power supply apparatus that is capable of charging electricity users the accurate rate according to the amount of electricity used, that is easy to install and use, and is capable of supplying electricity to users and charge electric rates by using previous existing electricity facilities without large facility investment.

SUMMARY

Technical Problem

One or more embodiments include a power supply apparatus and a power supply system for supplying power to electric vehicles and easily charging electric rates by simply modifying or replacing an existing electricity facility such as power outlets.

One or more embodiments include a power supply apparatus and a power supply system for supplying power after pre-payment made through a user's mobile device by using an automatic response service (ARS) or web page access method, to thereby simplify the use and payment of the rates.

One or more embodiments include a power supply apparatus and a power supply system having high security by providing a one-time power activation code that is changed for each use by using an encoded algorithm.

The objectives to be solved according to the present disclosure are not limited to the above descriptions, and other technical objectives not mentioned will be clearly understood by those skilled in the art from the following description.

Solution

According to one or more embodiments, a power supply apparatus for supplying power to an external electric device includes: a power outlet unit, to which a power plug of the external electric device is coupled, and supplying electricity to the external electric device; a power control unit controlling power supply from the power outlet unit to the external electric device; and a user interface unit connected to the power control unit and receiving a power activation code from a user, wherein the power control unit supplies power from the power outlet unit to the external electric device during a usage period corresponding to the power activation code.

The power outlet unit may include an identification number, and the user may receive the power activation code corresponding to the identification number and the usage period of the power supply apparatus from a central control center that manages the power supply apparatus, by using a telephone or a mobile device of the user.

The central control center may generate the power activation code by using a one-time password (OTP) method.

The identification number may be provided using a quick response (QR) code method.

The power outlet unit may include a terminal connecting unit that is accessible by an external terminal for inspecting the power supply apparatus.

The power supply apparatus may further include a terminal embedded with a real time clock (RTC) circuit to generate the power activation code by using an OTP method.

According to one or more embodiments, a power supply system for supplying power to an external electric device, includes: a power supply apparatus for supplying power to the external electric device; and a central control center generating or managing an activation code for activating the power supply apparatus, wherein the power supply apparatus includes: a power outlet unit, to which a power plug of the external electric device is coupled, and supplying electricity to the external electric device; a user interface unit for receiving a power activation code from a user; a power control unit controlling power to be supplied from the power outlet unit to the external electric device, when the power activation code is input from the user via the user interface unit, wherein the central control center generates the power activation code corresponding to an identification number of the power supply apparatus and a usage period of the power supply apparatus.

The central control center may generate different power activation codes by using a certain algorithm each time when the power activation code is generated.

The central control center may provide the power activation code to a mobile device of the user by using an automatic response service (ARS) method or via a web page.

The central control center may inform a usage rate corresponding to the usage period via ARS or a web page, and when payment of the usage rate via the user's telephone or mobile device is completed, the central control center may provide the power activation code to the mobile device of the user.

The central control center may manage information of a plurality of power supply apparatuses, and receive identification numbers of the power supply apparatuses from owners of the power supply apparatuses and register the power supply apparatuses.

According to one or more embodiments, a method of using a power supply apparatus for supplying power to an external electric device, includes: receiving, by a central control center controlling the power supply apparatus, an identification number of the power supply apparatus and a usage period of the power supply apparatus via a mobile device of a user of the power supply apparatus; generating and transmitting, by the central control center, a power activation code corresponding to the identification number of the power supply apparatus and the usage period of the power supply apparatus to activate the power supply apparatus; inputting the power activation code via a user interface unit; and when the power activation code is input, supplying, by the power supply apparatus, power to the external electric device.

The method may further include informing, by the central control center, a usage rate corresponding to the usage period of the power supply apparatus via an ARS or a web page; and making payment of the usage rate by using the mobile device of the user.

Effects of Disclosure

According to a power supply apparatus of the present disclosure, limited use of electricity outlets in public facilities may be enabled and existing billing systems may be improved. Without the need for an owner of an electricity supply facility to install a complicated power supply system and a communication system for payment and management, billing may be done by simply changing and replacing existing power outlets, and thus, more charging stations for electric vehicles may be opened easily. Accordingly, the supply of electric vehicles may be promoted.

In addition, by supplying power after pre-payment of electricity usage rates via an automatic response service (ARS) method or a web page access method by using a user's mobile device, use and payment of the power supply apparatus and system may be simplified.

In addition, by providing a different one-time power activation code for each use through a certain algorithm, the power supply apparatus and system may be safely protected from external hacking.

DETAILED DESCRIPTION

Hereinafter, embodiments of the present disclosure will be described in detail with reference to the accompanying drawings so that those skilled in the art may easily implement the present disclosure. However, the present disclosure may be implemented in various different forms, and are not limited to the embodiments described herein. In the drawings, parts irrelevant to the description are omitted to clearly describe the embodiments of the present disclosure.

The terminology used herein is for the purpose of describing particular embodiments only and is not intended to be limiting of the present disclosure. An expression used in the singular may encompass the expression of the plural, unless it has a clearly different meaning in the context.

In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, the components shown in the embodiments of the present disclosure are shown independently to represent different characteristic functions, and do not mean that each component is made of separate hardware or one software component unit. That is, each component is described by listing each component for convenience of description, and at least two of the components may be combined into one component, or one component may be divided into a plurality of components to perform a function. The integrated and separated embodiments of each of these components are also included within the scope of the present disclosure without departing from the spirit of the disclosure.

In addition, the following embodiments are provided to more clearly explain to those skilled in the art, and the shape and size of the elements in the drawings may be exaggerated for more clear description.

Hereinafter, embodiments of the present disclosure will be described more fully with reference to the accompanying drawings.

Figure 1:
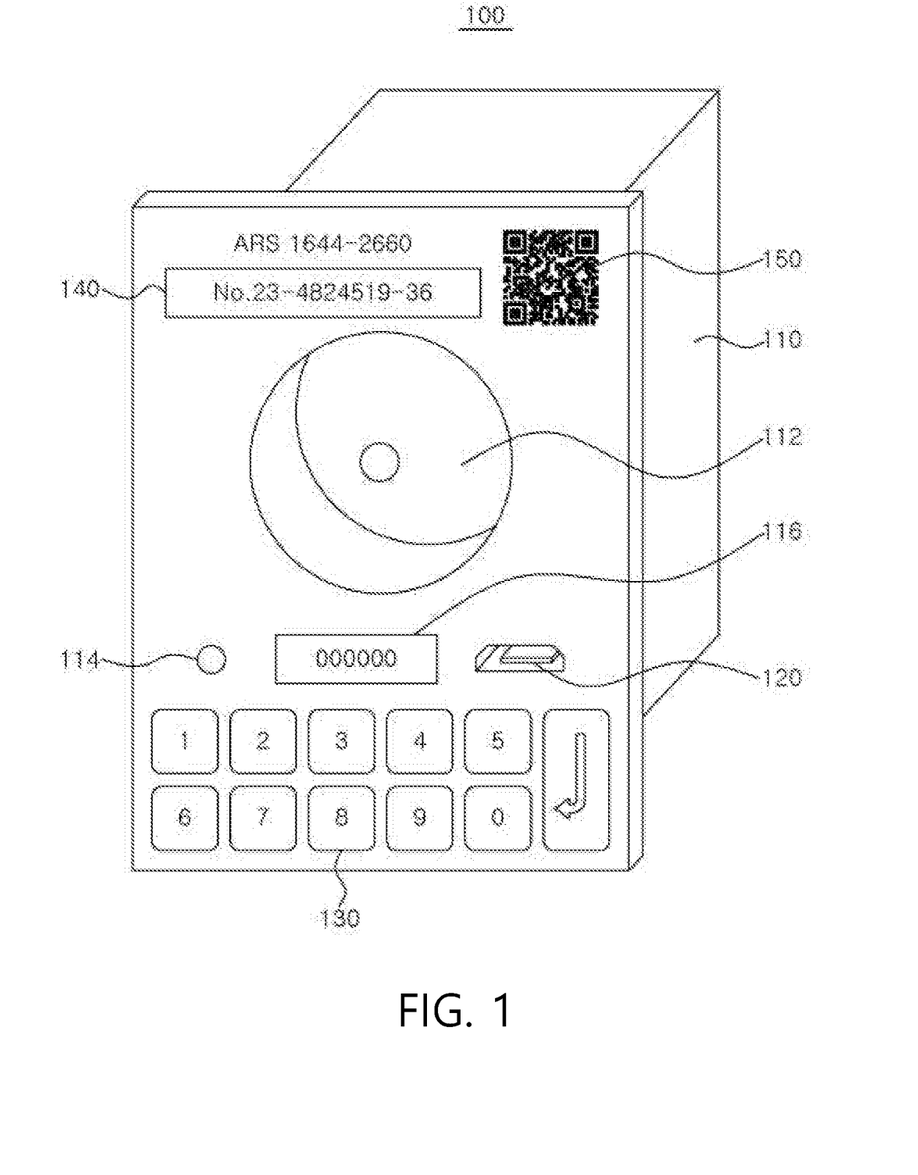
FIG. 1 is a schematic diagram of a power supply apparatus according to an embodiment of the present disclosure.
Figure 2:
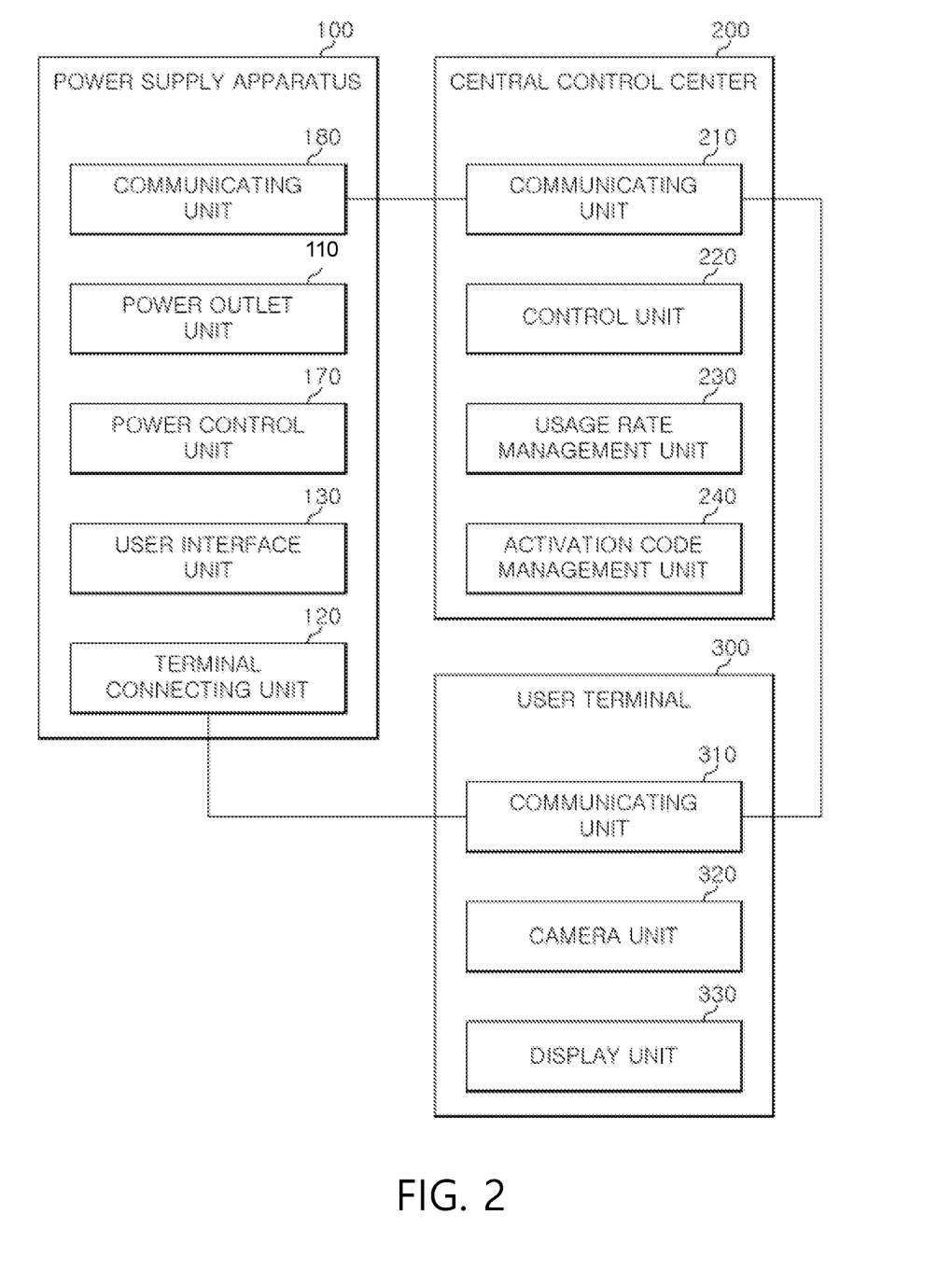
FIG. 2 is a structural block diagram of the power supply apparatus illustrated in FIG. 1 and a central control center.

FIG. 1 is a schematic diagram of a power supply apparatus according to an embodiment of the present disclosure. FIG. 2 is a structural block diagram of the power supply apparatus illustrated in FIG. 1 and a central control center.

Referring to FIGS. 1 and 2, a power supply apparatus 100 according to an embodiment of the present disclosure is an apparatus for supplying power to and charging not only electric transportation means such as electric vehicles, electric motorcycles, or electric bicycles, but also rechargeable external electric devices. The power supply apparatus 100 may be installed in a power grid of individual homes, multi-family houses such as apartments, or public facilities.

The power supply apparatus 100 may be easily installed by being connected to a power supply line at an additional location by simply replacing an existing electric outlet, through which power is supplied, or by coupling or attaching the power supply apparatus 100 to an existing electric outlet.

The power supply apparatus 100 may include a power outlet unit 110, a power control unit 170, and a user interface unit 130.

The power outlet unit 110 is provided to supply electricity to the external electric device by inserting a power plug of the external electric device into the power outlet unit 110 to couple the same to the power supply apparatus 100 to supply power to the external electric device. The power outlet unit 110 may be in a box-type housing shape to be compatible with a quadrangular outlet according to the related art, and an outlet unit 112, into which a power plug of the external electric device may be inserted, may be provided on a front surface of the power outlet unit 110. In the present embodiment, the outlet unit 112 may be in a shape into which a circular plug may be inserted, but is not limited thereto, and may be in various shapes that may correspond to the shape of a plug of an external electric device. Alternatively, an additional adapter (not shown) that is coupled to a plug of the external electric device may be inserted into the outlet unit 112.

The power control unit 170 may be provided inside the housing of the power outlet unit 110 and control power supply from the power outlet unit 110 to the external electric device.

The user interface unit 130 may be connected to the power control unit 170 to receive a power activation code from a user. A user who is to use the power supply apparatus 100 may input a power activation code that allows use of the power supply apparatus 100 via the user interface unit 130. Accordingly, the power control unit 170 may supply power for a usage period corresponding to the power activation code or power corresponding to a required power amount, from the power outlet unit 110 to the external electric device. In the present embodiment, the user interface unit 130 may include button keys from the numbers of 0 to 9, but is not limited thereto, and may also be a touch pad or a key input device whereby Korean and/or English alphabets may be both input. When a user inputs numbers of the user interface unit 130, the numbers input by the user may be displayed on an input display window 116.

Meanwhile, the power supply apparatus 100 according to an embodiment of the present disclosure may include a product identification number 140. The product identification number 140 is a unique number to identify the power supply apparatus 100 and is differently assigned to each power supply apparatus 100. A user may transmit the product identification number 140 to a central control center 200 by communicating with the central control center 200 and receive the power activation code from the central control center 200. When the user inputs the received power activation code via the user interface unit 130, the power supply apparatus 100 may supply power to an electric device of the user. Here, a light-emitting diode (LED) display device 114 may be provided in the power supply apparatus 100 to display a status of the power supply apparatus 100. For example, when the LED display device 114 is in green, this indicates that the power supply apparatus 100 is currently normally supplying power; when the LED display device 114 is in red, it may indicate that power supply to the power supply apparatus 100 is currently blocked.

A product identification number may be assigned by using a Quick Response (QR) code 150 instead of numbers. In this case, the user may capture an image of the QR code 150 and transmit the captured image of the QR code 150 to the central control center 200 by communicating with the central control center 200. The central control center 200 may identify the power supply apparatus 100 based on the received image of the QR code 150 and transmit a power activation code corresponding thereto to a mobile device of the user.

The user may call and connect to the central control center 200 by inputting the product identification number 140 by using the mobile device of the user. In this case, the central control center 200 may inform the user of the power activation code by voice by using an automatic response service (ARS) method. Alternatively, the central control center 200 may transmit the power activation code to the user's mobile device via a text message.

Meanwhile, the power supply apparatus 100 according to an embodiment of the present disclosure may include a terminal connecting unit 120. The owner of the power supply apparatus 100 may communicatively connect an external terminal to the power supply apparatus 100 via the terminal connecting unit 120 to inspect the power supply apparatus 100. For example, the usage history, records of malfunctions of the power supply apparatus 100 or the like, may be received, and a self-inspection function may be performed. In addition, the power supply apparatus 100 receives an power activation code that is changed each hour, from the central control center 200, thereby controlling usage periods with respect to charging of the rates. The external terminal may perform security check of the power supply apparatus 100 and perform synchronization a clock in the power supply apparatus 100 with a clock in the central control center 200.

In the present embodiment, the terminal connecting unit 120 is described by taking wired communication connection such as USB, RS-232, RS-485, but wireless communication such as Wi-Fi or NFC, Bluetooth is also possible.

In addition, the power supply apparatus 100 according to an embodiment of the present disclosure may include a communicating unit 180. The power supply apparatus 100 may be communicatively connected to a central control center 200 via the communicating unit 180. The communicating unit 180 of the power supply apparatus 100 may be connected to the communicating unit 210 of the central control center 200 via a wired or wireless communication network. In this case, the user may directly input the product identification number 140 of the power supply apparatus 100 via the user interface unit 130, and the input product identification number 140 may be transmitted to the communicating unit 210 of the central control center 200 via the communicating unit 180.

Figure 3:
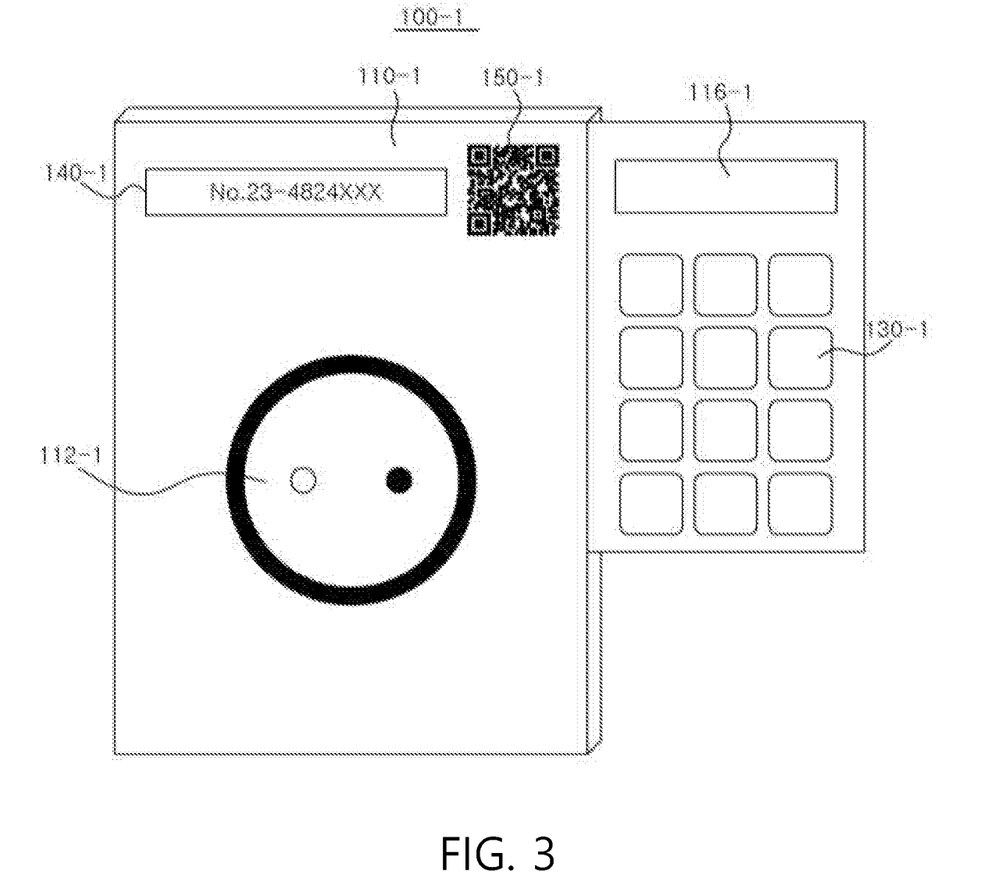
FIG. 3 illustrates a power supply apparatus according to another embodiment of the present disclosure.

FIG. 3 illustrates a power supply apparatus according to another embodiment of the present disclosure.

Referring to FIG. 3, a power supply apparatus 100-1 according to another embodiment of the present disclosure is identical to the power supply apparatus 100 illustrated in FIG. 1, except for structures of a user interface unit 130-1 and an input display window 116-1 that are different from the embodiment illustrated in FIG. 1, and the other configuration is the same. In the power supply apparatus 100-1 according to the present embodiment, the user interface unit 130-1 is not provided on a front surface of a power outlet unit 110-1, but on a lateral surface thereof in the form of an additional key pad. In addition, the input display window 116-1 may be provided above the key pad of the user interface unit 130-1.

Figure 4:
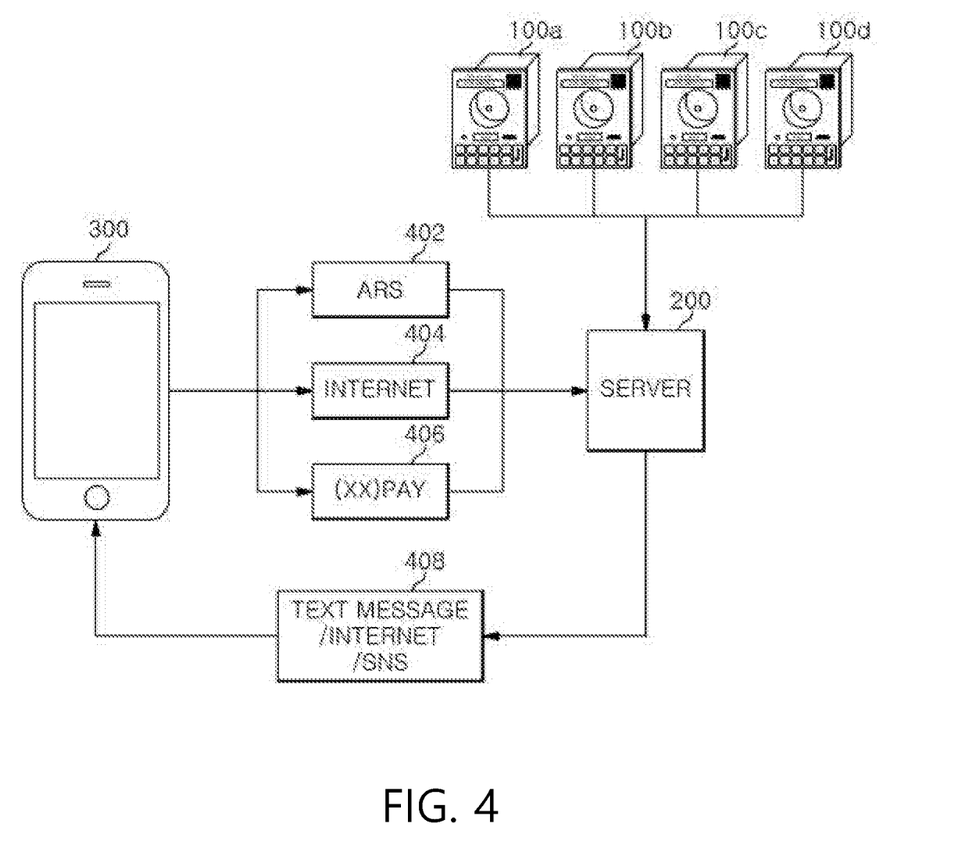
FIG. 4 illustrates a communication method of a power supply apparatus with respect to a central control center, according to an embodiment of the present disclosure.

FIG. 4 illustrates a communication method used with respect to a central control center of a power supply apparatus according to an embodiment of the present disclosure.

Referring to FIGS. 2 and 4, the central control center 200 according to an embodiment of the present disclosure is provided to manage information of a plurality of power supply apparatuses 100, 100a, 100b, 100c, and 100d and generate and/or manage an activation code for activation of the power supply apparatuses 100, 100a, 100b, 100c, and 100d. The central control center 200 may generate a power activation code corresponding to identification numbers of the power supply apparatuses 100, 100a, 100b, 100c, and 100d and usage periods of the power supply apparatuses 100, 100a, 100b, 100c, and 100d.

The central control center 200 may include a communicating unit 210, a usage rate management unit 230, an activation code management unit 240, and a control unit 220 controlling these.

The communicating unit 210 may be communicatively connected to the communicating unit 180 of the power supply apparatus 100. In this case, the product identification number 140 received from the user interface unit 130 of the power supply apparatus 100 may be transmitted to the communicating unit 210 of the central control center 200 via the communicating unit 180 of the power supply apparatus 100. The power supply apparatus 100 may not include the communicating unit 180 according to embodiments, and in this case, a communicating unit 310 of a user mobile device 300 may be communicatively connected to the communicating unit 210 of the central control center 200. In addition, a camera unit 320 may be provided in the user mobile device 300, and an image of the QR code 150 of the power supply apparatus 100 may be captured using the camera unit 320 and the captured image may be transmitted to the central control center 200.

The usage rate management unit 230 may calculate a usage rate based on at least one of an installation location of the power supply apparatus 100, a current power unit price of a corresponding region, and usage period information of a user, from the product identification number 140 of the power supply apparatus 100 received from the power supply apparatus 100 or the user mobile device 300. The usage rate calculated by using the usage rate management unit 230 may be transmitted to the communicating unit 180 of the power supply apparatus 100 via the communicating unit 210 or to the user mobile device 300, according to embodiments. A display unit 330 may be provided in the user mobile device 300 and display the usage rate. Thus, the user may identify usage rates based on information such as a charging period of an electric device such as an electric vehicle.

Meanwhile, the central control center 200 may operate an ARS or a web page. The user may call the central control center 200 by using the user mobile device 300 of the user and be provided with information via an ARS 402 or be provided with information via a web page by using an Internet access 404 to the central control center 200. According to the ARS 402, the user is guided by voice by the central control center 200, and may input the product identification number 140 of the power supply apparatuses 100, 100a, 100b, 100c, and 100d and usage periods thereof and receive information corresponding to the identification number and the usage period from the central control center 200. The usage rates may be informed via a text message. According to the Internet access 404, the user may access a web page of the central control center 200 and input the product identification number 140 and usage period, and input an image of the QR code 150 and the usage period. The central control center 200 may notify a user of the usage rate via a web page or a social network service (SNS) based on at least one of an installation location of the power supply apparatus 100, the current power price of a corresponding region, and usage period information of the user.

The user may make payment (406) of the amount corresponding to the usage rate by using the user mobile device 300. In this case, payment may be made by using a telephone banking service or credit card payment may be made directly on the web page of the central control center 200. In addition, the rates may be pre-paid by using other various electronic payment services. When payment is completed, the central control center 200 may notify the user of the completion of the payment via a text message or a web page or an SNS.

Meanwhile, when payment by the user is completed, the central control center 200 may transmit a power activation code to allow use of the power supply apparatuses 100, 100a, 100b, 100c, and 100d via a text message, a web page or an SNS, depending on the ARS 402 or the Internet access 404. The user may start using the power supply apparatus 100 by inputting the power activation code via the user interface unit 130 of the power supply apparatus 100.

The activation code management unit 240 is a database for storing and managing encoded codes for permission of use of the power supply apparatuses 100, 100a, 100b, 100c, and 100d. Each time when a request for use of the power supply apparatuses 100, 100a, 100b, 100c, and 100d is made by a user, the activation code management unit 240 generates and manages a power activation code, and may generate different power activation codes each time by using a certain encoded algorithm. Accordingly, the power supply apparatuses 100, 100a, 100b, 100c, and 100d may be protected safely from the risk of external hacking. The activation code management unit 240 may generate the power activation code by using the product identification number 140, an internal number that is attached to an inner side of the power outlet unit 110 or identified from a product manual, and a number for setting rules for generating an additional code. The activation code management unit 240 may generate the power activation code by using a one-time password (OTP) method.

In the above-described embodiment, the power activation code generated by the activation code management unit 240 of the central control center 200, by using an OTP method, is described above. However, apart from the central control center 200, an additional terminal provided with a real time clock (RTC) circuit to generate an OTP each time when a user wishes to use, may be provided.

Figure 5:
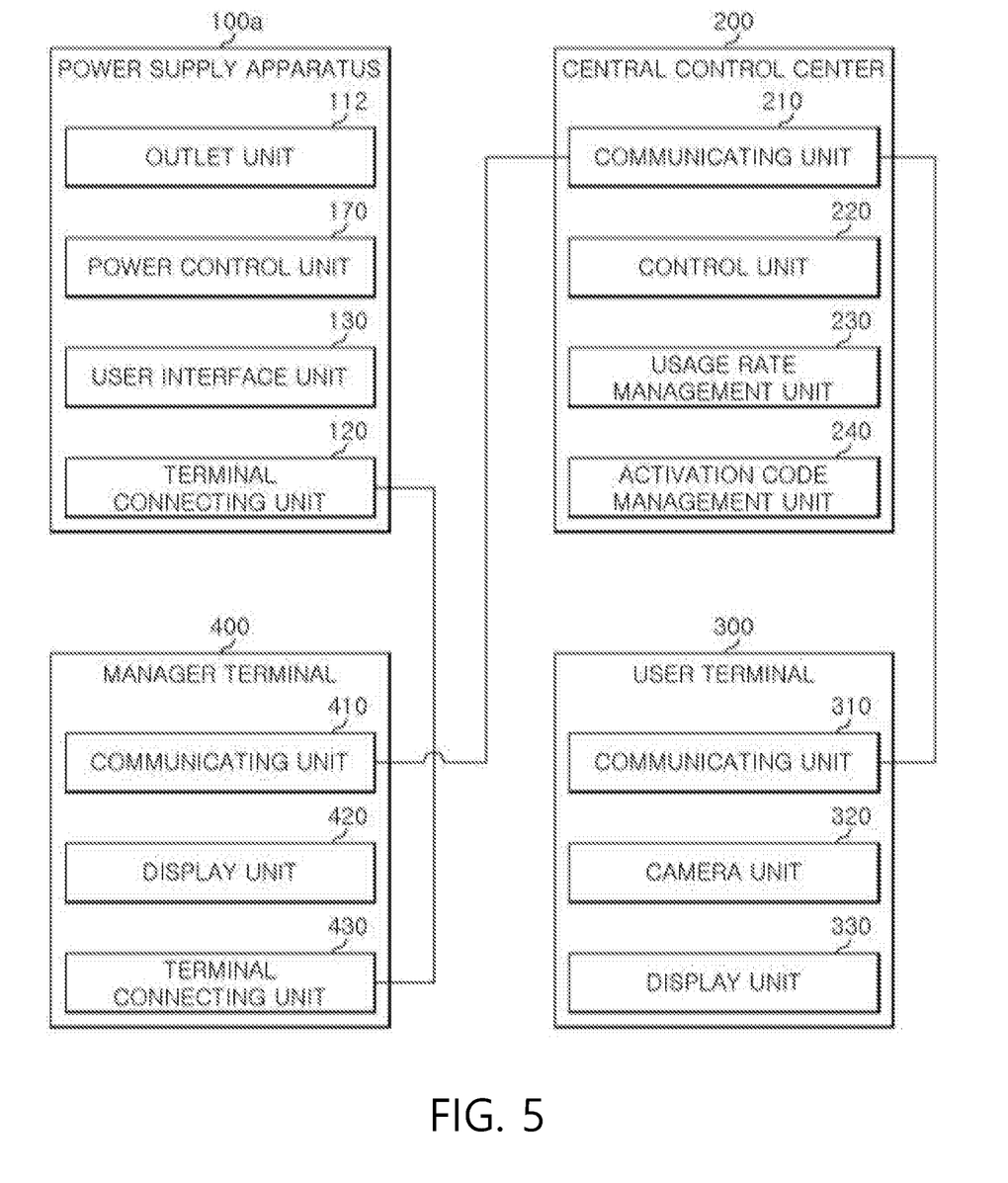
FIG. 5 is a structural block diagram of a power supply apparatus and a central control center, according to another embodiment of the present disclosure.

FIG. 5 is a structural block diagram of a power supply apparatus and a central control center according to another embodiment of the present disclosure. Referring to FIG. 5, a power supply apparatus and a central control center according to another embodiment of the present disclosure are almost identical to the entire system illustrated in FIG. 1, except that a manager terminal 400 is additionally included. Hereinafter, differences from the system of FIG. 1 described above will be described only.

Unlike the power supply apparatus 100, a power supply apparatus 100a does not include the communicating unit 180. Instead, the communicating unit 310 of the user mobile device 300 may communicate with the communicating unit 210 of the central control center 200. Accordingly, the user may receive a power activation code by accessing the central control center 200 via the user mobile device 300. Meanwhile, in the present embodiment, the manager terminal 400 is included separately from the user mobile device 300. The manager terminal 400 includes a terminal connecting unit 430 accessible to the terminal connecting unit 120 of the power supply apparatus 100a. Accordingly, a manager may access the power supply apparatus 100a via the manager terminal 400 to receive usage history or records of malfunctions of the power supply apparatus 100a, and may perform a self-inspection function. In addition, the manager terminal 400 may perform security check of the power supply apparatus 100 and synchronization of a clock in the power supply apparatus 100 with a clock in the central control center 200.

According to the power supply apparatuses of the embodiments described above, limited use of electric outlets in public facilities may be enabled and the existing billing system may be improved. Without the need for an owner of an electricity supply facility to install a complicated power supply system, billing may be performed by simply changing and replacing existing power outlets, and thus, more charging stations for electric vehicles may be opened easily. Accordingly, the supply of electric vehicles may be promoted.

In addition, by supplying power after pre-payment of electricity usage rates via an (ARS) method or a web page access method by using a user's mobile device, use and payment of the power supply apparatus and system may be simplified.

In addition, by providing a one-time power activation code differently for each use by using a certain algorithm, the power supply apparatus may be protected from external hacking.

Figure 6:
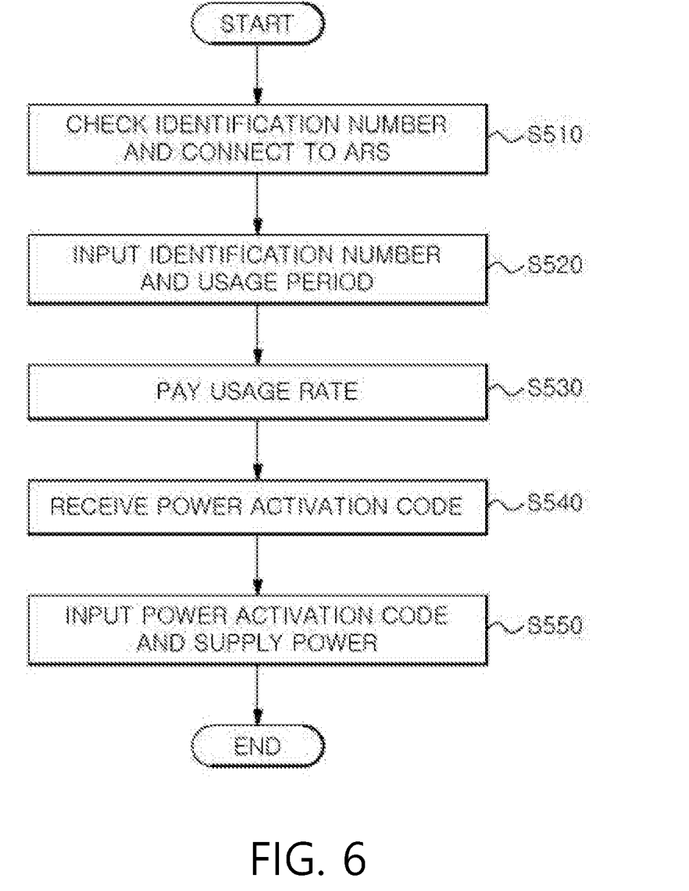
FIG. 6 is a flowchart of a method of using a power supply apparatus according to an embodiment of the present disclosure.

FIG. 6 is a flowchart of a method of using a power supply apparatus according to an embodiment of the present disclosure.

Referring to FIGS. 1 and 6, first, a user may check the product identification number 140 of the power supply apparatus 100, and call the central control center 200 by using his or her mobile device to connect to an ARS (S510).

According to the voice guide of the central control center 200, the user inputs the product identification number 140 and a usage period of the power supply apparatus 100 (S520).

Next, the central control center 200 calculates a usage rate based on the input product identification number 140 and the input usage period. The usage rate may be differently calculated for each power supply apparatus 100 and for each hour depending on a power unit price of a location where the power supply apparatus 100 is installed and other facilities costs. The central control center 200 informs the user of the calculated usage rate via ARS. The user may pay the usage rate by using his or her mobile device via telephone banking or bank transfer or electronic payment (S530).

When the payment is completed, the central control center 200 may generate a power activation code to allow use of the power supply apparatus 100 and transmits the power activation code to the user (S540). Here, the power activation code may be generated using an identification number of the power supply apparatus 100, an internal number, and a number for setting rules for generating an additional code. The power activation code may be generated, for example, by using an OTP method.

The user may turn on the power supply apparatus 100 by inputting the received power activation code via the user interface unit 130 of the power supply apparatus 100, to thereby supply power to an electric device of the user (S550).

Figure 7:
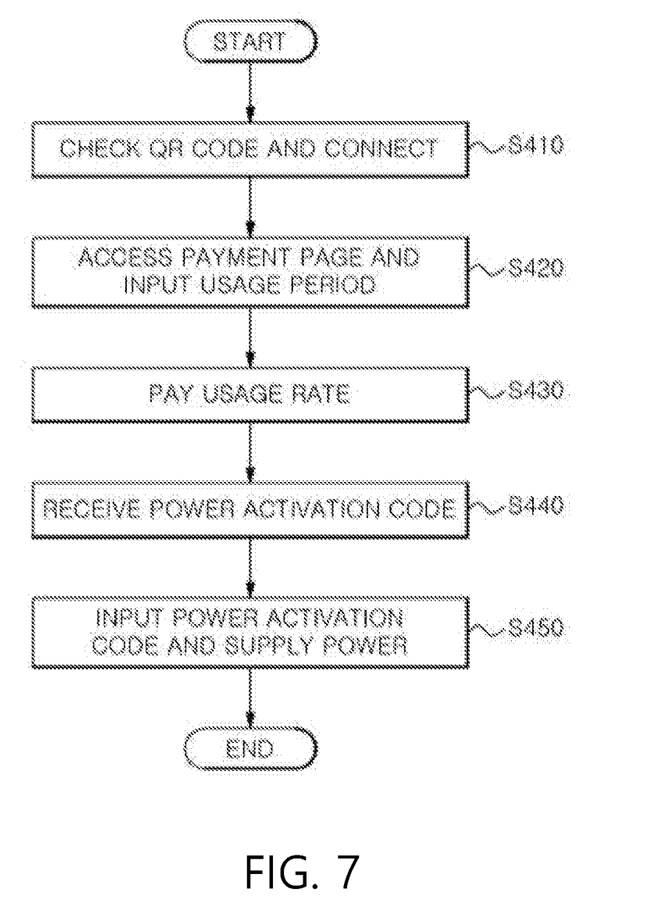
FIG. 7 is a flowchart of a method of using a power supply apparatus according to another embodiment of the present disclosure.

FIG. 7 is a flowchart of a method of using a power supply apparatus according to another embodiment of the present disclosure.

Referring to FIGS. 1 and 7, first, a user captures an image of the QR code 150 of the power supply apparatus 100 by using his or her mobile device, and accesses a web page (Internet homepage) of the central control center 200 by using the mobile device of the user (S410).

After accessing a payment page on the web page of the central control center 200, the user inputs the captured image of the QR code 150 and a usage period of the power supply apparatus 100 (S420) according to guidance.

Next, the central control center 200 may identify an identification number of the power supply apparatus 100 according to the QR code 150 to calculate a usage rate based on the identification number and the usage period. The usage rate may be differently calculated for each power supply apparatus 100 and for each hour according to a power unit price of a location where the power supply apparatus 100 is installed and other facilities costs. The central control center 200 informs the user of the calculated usage rate via the web page. The user may pay the usage rate by using his or her mobile device via telephone banking or bank transfer or electronic payment on the web page (S430).

When the payment is completed, the central control center 200 may generate a power activation code to allow use of the power supply apparatus 100 and transmits the power activation code to the user (S440). Here, the power activation code may be generated using an identification number of the power supply apparatus 100, an internal number, and a number for setting rules for generating an additional code. The power activation code may be generated, for example, by using an OTP method.

The user may turn on the power supply apparatus 100 by inputting the received power activation code via the user interface unit 130 of the power supply apparatus 100, to thereby supply power to an electric device of the user (S450).

Also according to the method of using a power supply apparatus according to an embodiment of the present disclosure, the same operating effects as those from the power supply apparatus according to the above embodiment may be obtained.

Figure 8:
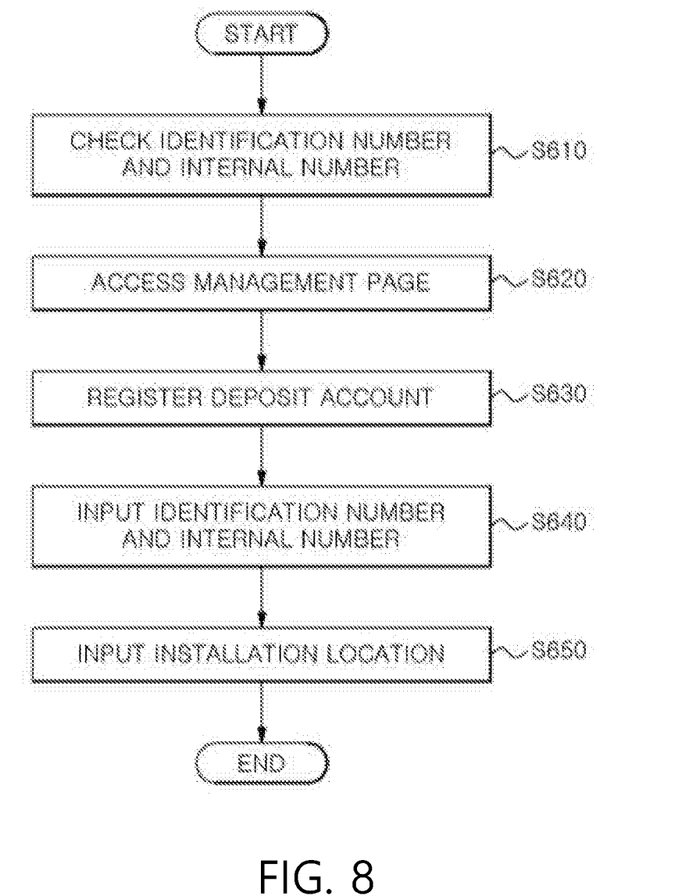
FIG. 8 is a flowchart of an initial registration process to use a power supply apparatus according to an embodiment of the present disclosure.

FIG. 8 is a flowchart of an initial registration process to use a power supply apparatus according to an embodiment of the present disclosure.

Referring to FIGS. 1, 2, and 8, to use the power supply apparatus 100 according to an embodiment of the present disclosure, first, the power supply apparatus 100 needs to be registered to the central control center 200 for use of the same a use registration.

The owner of the power supply apparatus 100 initially checks the product identification number 140 of the power supply apparatus 100 and an internal number (S610). The internal number may be attached to an inner side of the housing of the power supply apparatus 100 or identified from a product manual. Next, by using the user mobile device 300 of the owner, a management page (web page) of the central control center 200, via which the power supply apparatus 100 is controlled, is accessed (S620). Next, a deposit account to receive a usage rate from a user who wants to use the power supply apparatus 100 is registered to the central control center 200 (S630). Here, the owner may have a process of inputting the product identification number 140 and the internal number again to maintain security or for authentication purposes (S640). Finally, the owner may input an address of an installation location of the power supply apparatus 100 to manage information of the power supply apparatus 100 by the central control center 200 (S650).

In the above-described embodiments, it is described, for example, that the power activation code is received through a user's phone or mobile device, but embodiments of the present disclosure are not limited thereto, and the power activation code may also be checked on additional paper, for example, a receipt of a payment made at a cafe or the like or from an additional display device of an electronic screen device.

While the embodiments of the present disclosure have been described in detail above, it will be understood by those skilled in the art that various modifications may be made without departing from the scope of the present disclosure with respect to the above-described embodiments. For example, applications on various devices are available such that such that a control center transmits an encryption code based on an identification code assigned to an apparatus to be and a usage period of the apparatus, and a user inputs the encryption code into the apparatus to receive permission of the use thereof. For example, the present disclosure may be applied to public restrooms or disposable storage boxes. Therefore, the scope of the present disclosure should not be limited to the described embodiments, but should be defined by the claims below and equivalents thereof.

The invention claimed is:

1. A power supply apparatus for supplying power to an external electric device, the power supply apparatus comprising:
a communicating unit communicating with a central control center;
a power outlet unit, to which a power plug of the external electric device is coupled, and supplying electricity to the external electric device;
a power control unit controlling power supply from the power outlet unit to the external electric device;
a terminal embedded with a real time clock (RTC) circuit to generate a power activation code by using a one-time password (OTP) method; and
a user interface unit connected to the power control unit and receiving a power activation code from a user,
wherein the power control unit supplies power from the power outlet unit to the external electric device during a usage period corresponding to the power activation code,
a central control center that manages the power supply apparatus generates the power activation code by using a one-time password (OTP) method, and
a clock in the RTC circuit of the power supplying apparatus is synchronized with a clock in the central control center by the external electric device.

2. The power supply apparatus of claim 1, wherein the power outlet unit includes an identification number, and
the user receives the power activation code corresponding to the identification number and the usage period of the power supply apparatus, from the central control center that manages the power supply apparatus, by using a telephone or a mobile device of the user.

3. The power supply apparatus of claim 2, wherein the identification number is provided using a quick response (QR) code method.

4. The power supply apparatus of claim 1, wherein the power outlet unit comprises a terminal connecting unit that is accessible by an external terminal for inspecting the power supply apparatus.

5. A power supply system for supplying power to an external electric device, the power supply system comprising:
a power supply apparatus for supplying power to the external electric device; and
a central control center generating or managing an activation code for activating the power supply apparatus,
wherein the power supply apparatus comprises:
a communicating unit communicating with a central control center;
a power outlet unit, to which a power plug of the external electric device is coupled, and supplying electricity to the external electric device;
a terminal embedded with a real time clock (RTC) circuit to generate a power activation code by using a one-time password (OTP) method; and
a user interface unit for receiving a power activation code from a user; a power control unit controlling power to be supplied from the power outlet unit to the external electric device, when the power activation code is input from the user via the user interface unit,
wherein the central control center generates the power activation code corresponding to an identification number of the power supply apparatus and a usage period of the power supply apparatus by using a one-time password (OTP) method, and
a clock in the RTC circuit of the power supplying apparatus is synchronized with a clock in the central control center by the external electric device.

6. The power supply system of claim 5, wherein the central control center generates another power activation code by using an algorithm after the power activation code is generated.

7. The power supply system of claim 5, wherein the central control center provides the power activation code to a mobile device of the user by using an automatic response service (ARS) method or via a web page.

8. The power supply system of claim 5, wherein the central control center informs a usage rate corresponding to the usage period via ARS or a web page, and when payment of the usage rate via the user's telephone or mobile device is completed, the central control center provides the power activation code to the mobile device of the user.

9. The power supply system of claim 5, wherein the central control center manages information of a plurality of power supply apparatuses, and
receives identification numbers of the power supply apparatuses from owners of the power supply apparatuses and registers the power supply apparatuses.

10. A method of using a power supply apparatus for supplying power to an external electric device, the method comprising:
receiving, by a central control center controlling the power supply apparatus, an identification number of the power supply apparatus and a usage period of the power supply apparatus via a mobile device of a user of the power supply apparatus;
generating and transmitting, by the central control center, a power activation code corresponding to the identification number of the power supply apparatus and the usage period of the power supply apparatus to activate the power supply apparatus;
generating, by a terminal embedded with a real time clock (RTC) circuit of the power supply apparatus, a power activation code using a one-time password (OTP) method;

synchronizing, by the external electric device, a clock in the RTC circuit of the power supplying apparatus with a clock in the central control center;

receiving, by the power supply apparatus, the power activation code via a user interface unit of the power supply apparatus; and when the power activation code is input, supplying, by the power supply apparatus, power to the external electric device.

11. The method of claim 10, further comprising informing, by the central control center, a usage rate corresponding to the usage period of the power supply apparatus via an automatic response service (ARS) or a web page; and making payment of the usage rate by using the mobile device of the user.

* * * * *